Patented Feb. 13, 1940

2,190,605

UNITED STATES PATENT OFFICE 2,190,605

METHOD OF COLD MOLDING PLASTIC MATERIALS

Frank J. Moore, Woodbury, N. J., assignor to Plastics Molding Corporation, a corporation of New Jersey No Drawing. Application August 3, 1935, Serial No. 34,559. Renewed January 29, 1938

5 Claims. (Cl. 260—38)

This application relates to the cold molding of plastic materials. Many suggestions have been made for cold molding or molding at slightly elevated temperatures of plastic bodies and some of these have suggested the use of phenol-formaldehyde condensation products. Actually, such processes have had little or no commercial success principally because of the very high pressures necessary to accomplish the desired results. I have discovered a method whereby bodies of substantial strength can be molded cold (after which they are baked) at only relatively low pressures (such as those obtainable in the usual tableting machine) and at the same time these bodies have a good enough finish so that they take an appreciable polish when subjected to tumbling operations.

My invention is based on the discovery that if a phenolic resin is intimately incorporated with a finely divided inorganic filler it can be brought to a form where it is still substantially plastic so that it will coalesce under light pressure, but at the same time it will be in such condition that it will not unduly stick to the molds.

The method of accomplishing this can best be explained in conjunction with a description of the process.

The filler used is a finely divided inorganic material such as whiting. Other more or less equivalent bodies such as talc may also be used, but I have found that whiting gives the best results. The binder employed is a phenol-formaldehyde reaction product still in the liquid stage such for example as that produced by reacting phenol and formaldehyde in the presence of an alkaline catalyst until layer separation takes place. It is a well-recognized scientific fact that when phenol and formaldehyde are reacted in the presence of an alkaline catalyst until layer separation takes place, two separable liquids are obtained. The one containing the maximum amount of resin is insoluble in excess water, but nevertheless this liquid is a colloidal solution of resin in water and if it is brought to the anhydrous state by carefully distilling out the water by the use of vacuum, the remaining resin no longer will be a liquid. In other words, the phenol-formaldehyde resin resulting from the reaction is in the liquid stage because of the water incorporated with it. The filler and binder are mixed in the proportion of from 20 to 40 parts of binder to 100 parts of filler and I find that about 30 parts of binder give the best results. The coloring matter in the form of a dye or pigment can also be incorporated at the time of the original mixture. For example, to make a black, I may use about 2% of a spirit soluble resin dye such as is known in the trade.

The ingredients are mixed together in a heavy-duty mixer, for they form a stiff doughlike mass. When the mixing is thoroughly completed the mass of material is sliced up into comparatively thin sheets (about ¼–½ inch) and placed on trays and dried or otherwise subdivided for drying. It is an important part of my process that this drying be conducted at a relatively low temperature preferably under 110° F. and that it should be conducted only just to the point where the sheets can be broken as by a hammer mill. The test for this is that drying should be conducted until just beyond the point where the sheets will coalesce into solid lumps when squeezed in the hand at reasonable pressure. The time for drying usually takes from three to four weeks at ordinary room temperature but when heated in an oven to about 100° F. under proper drying conditions the time may be reduced materially, say to from five to seven days. During this drying operation some water comes off and some reaction undoubtedly takes place in the binder.

When this drying operation is completed the material is reduced to powder form as in a hammer mill and it will be found that this powder can be balled up by being squeezed in the hand. It preferably should then be subjected to some further drying until the mass squeezed in the hand will be friable rather than forming a solid lump.

I prefer to conduct the drying in the two stages described, as this gives better control of the operation but it is possible to dry the material in sheet form to approximately the desired end point, the important feature being that the powder should be in that state where it will not coalesce under reasonably light pressures but still be sufficiently plastic so that when given a heavier pressure as that of the tableting machine, it will coalesce. This is an important element of my invention which differs from the prior art processes which previously had dried and hardened the material to the point where very heavy pressures were needed. This difference is a vital one, for where the dry powder, when compressed, has only a limited adherence, in my case the binder is in the state where some flow will take place under the pressure used, but the material is still dry enough so it will not stick to the molds.

After the powder is dried to the proper point, it is run through an ordinary tableting machine such as is used with the ordinary phenol molding powder as a step preliminary to the actual molding, but in my process this machine gives the article its final form; for example, the powder may be molded into the form of buttons. A further test of the proper condition of the powder for pressing is that the articles coming from the tableting machine must be susceptible of substantial flexing without breaking. If the material is brittle at this point, it is an indication that the powder had been dried too much and the final baked product will be lacking in adequate strength. I run my material at the lightest pressure possible to obtain the necessary flow and this pressure may vary from about a few hundred pounds per square inch to about one thousand pounds per square inch or more depending upon the state of dryness of the material. In making buttons I have used pressures as low as two hundred pounds per square inch, but I find that if this pressure is increased slightly better results are obtained. By using these relatively light pressures the life of the dies used in molding is greatly increased.

After the tableting operation, the articles are baked by putting them in a cold oven and raising the temperature slowly. Thus for the first hour the temperature should be brought up from room temperature to a point between about 175° and 190° F. The temperature may be held within this range for another hour and then may be raised up to a finishing temperature which may be as high as from 300° to 360° F. I have found that the higher the temperature employed, the stronger is the product, provided the temperature does not exceed the decomposition point. After the articles are taken out of the oven they will ordinarily (though not necessarily) be given a scouring and tumbling treatment to improve the surface appearance.

I have found that when my process is carried out as above the product is rather hard and difficult to machine which may make difficulties, as, for example, where buttons are molded and subsequently drilled. This difficulty can be overcome by dividing the cure into two stages and applying the machining steps after a partial cure. In such case the material can be readily cut (though it is somewhat brittle) and afterwards can be further cured to give the product its full strength.

Instead of the binder above set forth, I may use other binders, such as 30 parts of liquid resin of the types now available on the market such, for example, as the liquid resin sold under the trade-name "Durez" to about 100 parts of filler.

What I claim is:
1. In the process of cold molding plastic material, the method of preparing materials for subsequent pressing and baking, which comprises reacting together phenol and formaldehyde with an alkaline catalyst until a resinous liquid separates from the aqueous layer, mixing such resinous liquid with a mineral filler to produce a doughy mass, forming such mass in shapes adapted for drying and drying the same for an extended period until coherent but frangible masses are obtained and adjusting the moisture content thereof and reducing such masses to powder form so that a powder is obtained which is sufficiently dry so that it cannot readily be balled up when squeezed in the hand but will coalesce at pressures of at least 200 pounds per square inch.

2. A process as specified in claim 1, in which the dried masses of material are broken up before the drying operation is completed and the resulting powder is further dried to give material of the desired consistency.

3. A process as specified in claim 1, in which the drying of the moisture is conducted at a temperature below 110° F. for a period of at least five days.

4. In the process of cold molding, the method of preparing materials for subsequent pressing and baking which comprises preparing a heat-hardenable resin of the phenol-formaldehyde type in a liquid colloidal solution in water, incorporating such liquid with subdivided filling material to form a soft, shapable mass, drying such mass until the particles of filling material are readily broken apart and will not cling together when squeezed in the hand but will coalesce under high pressure of at least 200 pounds per square inch and become permanently bonded upon subsequent heating.

5. In the process of cold molding, the method of preparing materials for subsequent pressing and baking which comprises mixing with subdivided filling material a phenolic resin in the liquid stage, reacted to the point where it has limited solubility for water but still remains as a colloidal solution of resin in water, to form a doughy mass, drying such material for an extended period until coherent but frangible masses are obtained and adjusting the consistency thereof and reducing such masses to powder form so that a powder is obtained which is sufficiently dry so that it cannot readily be balled up when squeezed in the hand but will coalesce at pressures in excess of 200 pounds per square inch.

FRANK J. MOORE.